(12) United States Patent
Huang et al.

(10) Patent No.: US 12,429,830 B2
(45) Date of Patent: Sep. 30, 2025

(54) TIME DISPLAY METHOD AND ELECTRONIC DEVICE

(71) Applicant: HUAWEI TECHNOLOGIES CO., LTD., Guangdong (CN)

(72) Inventors: Liwei Huang, Shenzhen (CN); Jing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 450 days.

(21) Appl. No.: 17/913,071

(22) PCT Filed: Mar. 23, 2021

(86) PCT No.: PCT/CN2021/082340
§ 371 (c)(1),
(2) Date: Sep. 20, 2022

(87) PCT Pub. No.: WO2021/190489
PCT Pub. Date: Sep. 30, 2021

(65) Prior Publication Data
US 2023/0143866 A1  May 11, 2023

(30) Foreign Application Priority Data
Mar. 25, 2020 (CN) .......................... 202010219136.7

(51) Int. Cl.
*H04M 1/72451* (2021.01)
*G04G 9/08* (2006.01)
(Continued)

(52) U.S. Cl.
CPC ........... *G04G 9/087* (2013.01); *G06F 3/0488* (2013.01); *G06T 5/50* (2013.01); *H04M 1/72403* (2021.01);
(Continued)

(58) Field of Classification Search
CPC .............. G04G 9/087; H04M 1/72451; H04M 1/72403; G06F 3/0488; G06T 5/50
(Continued)

(56) References Cited

U.S. PATENT DOCUMENTS 10,620,590 B1 * 4/2020 Guzman ............... G06F 3/0483
2005/0151849 A1 7/2005 Fitzhugh et al.
(Continued)

FOREIGN PATENT DOCUMENTS

| CN | 103259972 A | 8/2013 |
| CN | 105739808 A | 7/2016 |

(Continued)

OTHER PUBLICATIONS

Extended European Search Report in European Appln No. 21775242.7, dated Jul. 25, 2023, 10 pages.
(Continued)

*Primary Examiner* — Jin Ge
(74) *Attorney, Agent, or Firm* — Fish & Richardson P.C.

(57) ABSTRACT

Embodiments of this application provide a time display method and an electronic device. The method is applied to an electronic device with a display, and the method includes: The electronic device obtains a first image, a second image, and a third image, where the first image includes a first part of a target control, the second image includes a second part of the target control, and the third image includes a digital clock. The electronic device sequentially superimposes the first image, the third image, and the second image to generate a to-be-displayed image, where the first part and the second part of the target control form the target control, and the target control overlaps at least one digit of the digital clock. The electronic device displays the to-be-displayed image when the display is in an always-on-display state.

19 Claims, 13 Drawing Sheets

(51) Int. Cl.
*G06F 3/0488* (2022.01)
*G06T 5/50* (2006.01)
*H04M 1/72403* (2021.01)

(52) U.S. Cl.
CPC ............... *H04M 1/72451* (2021.01); *G06T 2207/20221* (2013.01)

(58) Field of Classification Search
USPC ........................................... 345/581
See application file for complete search history.

(56) References Cited

U.S. PATENT DOCUMENTS

| | | | | |
|---|---|---|---|---|
| 2006/0277469 | A1* | 12/2006 | Chaudhri | G06F 8/61 715/709 |
| 2012/0066629 | A1* | 3/2012 | Lee | H04M 1/72451 715/764 |
| 2016/0057363 | A1 | 2/2016 | Posa | |
| 2018/0165002 | A1* | 6/2018 | Yang | H04L 51/224 |
| 2019/0339860 | A1* | 11/2019 | Chen | G06F 1/163 |

FOREIGN PATENT DOCUMENTS

| | | |
|---|---|---|
| CN | 108388467 A | 8/2018 |
| CN | 110149442 A | 8/2019 |
| CN | 110536151 A | 12/2019 |
| JP | 2012090019 A | 5/2012 |

OTHER PUBLICATIONS

[No Author Listed] [online], "Huawei EMUI10.1 is officially released! Compared with EMUI10, how big is the improvement this time?," Published on Mar. 26, 2020, retrieved on Apr. 26, 2023, <URL:https://haokan.baidu.com/v?vid=9142859350323593875andpd=bjhandfr=bjhauthorandtype=video%3E>, 1 page [Video Submission].

International Search Report and Written Opinion in International Appln. No. PCT/CN2021/082340, mailed on Jul. 1, 2021, 20 pages (with English translation).

Office Action in Indian Appln. No. 202247056767, mailed on Mar. 20, 2024, 2 pages (with English translation).

* cited by examiner

TIME DISPLAY METHOD AND ELECTRONIC DEVICE

CROSS-REFERENCE TO RELATED APPLICATIONS

This application is a national stage of International Application No. PCT/CN2021/082340, filed on Mar. 23, 2021, which claims priority to Chinese Patent 202010219136.7, filed on Mar. 25, 2020. The disclosures of the aforementioned applications are hereby incorporated by reference in their entireties.

TECHNICAL FIELD

The present invention relates to the field of electronic device technologies, and in particular, to a time display method and an electronic device.

BACKGROUND

With development of electronic technologies, electronic devices such as a smartphone and a tablet computer are increasingly popular, and users are increasingly dependent on electronic devices. For example, the electronic device is a mobile phone. A user taps to wake a screen of the mobile phone many times every day. In most cases, a purpose of waking the screen of the mobile phone is to view time, various notifications, and the like. To meet people's function requirements for electronic devices, an always on display (always on display, AOD) function is set on many electronic devices, to improve display effects of the electronic devices and user experience.

When a digital clock is displayed in an always-on-display interface of the electronic device, a pattern may be displayed as a background or a foreground of the digital clock. A current always on display effect is as follows: A location relationship between the digital clock and the pattern is a front-to-back relationship. In one case, the digital clock is superimposed on the pattern, which forms a visual effect that a digit is in front of the pattern and the pattern is behind the digit. In another case, the pattern is superimposed on the digital clock, which forms a visual effect that the pattern is in front of a digit and the digit is behind the pattern. The two display effects are both monotonous, and therefore, user's pursuit of a richer display effect cannot be met.

SUMMARY

Embodiments of this application provide a time display method and an electronic device, to provide a richer display effect for a user when an electronic device displays a digital clock in an always-on-display state.

According to a first aspect, an embodiment of this application provides a time display method, and the method is applied to an electronic device with a display. The method includes: The electronic device obtains a first image, a second image, and a third image, where the first image includes a first part of a target control, the second image includes a second part of the target control, and the third image includes a digital clock. The electronic device sequentially superimposes the first image, the third image, and the second image to generate a to-be-displayed image. In the to-be-displayed image, the first part and the second part of the target control form the target control, and the target control overlaps at least one digit of the digital clock. The electronic device displays the to-be-displayed image when the display is in an always-on-display state.

Based on this solution, the electronic device sequentially superimposes the first image including the first part of the target control, the third image including the digital clock, and the second image including the second part of the target control, to generate the to-be-displayed image. In the generated to-be-displayed image, the first part and the second part of the target control form the target control, and an interspersed visual effect that the first part of the target control is displayed behind the digit and the second part of the target control is displayed in front of the digit can be formed. Compared with a display effect that a digit and an entire target control form a simple front-to-back relationship, a richer display effect can be provided for a user in this solution when the electronic device displays the digital clock in the always-on-display state.

In a possible design, the digital clock includes digits used to represent hours and digits used to represent minutes. The digits used to represent hours are in a different row from the digits used to represent minutes. The digits used to represent hours include a first digit in the tens place and a second digit in the ones place. The target control included in the to-be-displayed image overlaps the first digit.

In this design, the first digit is a digit that is in the tens place and that represents hours, and a possible value of the first digit is 0, 1, or 2. In a timing process of the digital clock, the first digit changes three times in a timing period of 24 hours, and a change frequency of the first digit is lower than that of the second digit, a third digit, and a fourth digit, so that power consumption can be reduced.

In a possible design, that the electronic device obtains a first image and a third image may be implemented by separately invoking the first image and the third image according to a file name of the first image and a file name of the third image. The file name of the first image includes a layout type of the digital clock, a value of the digit that overlaps the target control on the digital clock, and a location relationship between the first image and the digital clock. The file name of the third image includes the clock layout type of the digital clock, the value of the digit that overlaps the target control on the digital clock, and a location relationship between the third image and the digital clock.

For example, the layout type of the digital clock is a single-clock layout, the value of the digit that overlaps the target control on the digital clock is 0, the location relationship between the first image and the digital clock is that the first image is a background of the digital clock, and the location relationship between the first image and the digital clock is that the first image is a foreground of the digital clock. In this example, the file name of the first image is single_digit0_bg.png, and the file name of the second image is single_digit0_fg.png.

In a possible design, a size of the first part of the target control is less than a size of the first image, and a size of the second part of the target control is less than a size of the second image. In this design, the target control does not cover the entire superimposed image, that is, there is a transparent and hollow area on the to-be-displayed image. In this way, when the to-be-displayed image is displayed in the always-on-display state, only pixels in an area in which the target control is located need to emit light, so that screen burning can be prevented.

In a possible design, a layout of the digital clock may be a single-clock layout, or may be a dual-clock layout.

In a possible design, each digit included in the digital clock corresponds to three groups of image resources, the three groups of image resources include one group of image resources corresponding to the single-clock layout and two groups of image resources respectively corresponding to two clocks in the dual-clock layout, and each group of image resources includes the first image used as a background layer and the second image used as a foreground layer.

In a possible design, image formats of the first image, the second image, and the third image are all a portable network graphics png format. In the to-be-displayed image generated by superimposing the first image, the second image, and the third image, all areas other than the digit on the digital clock and the target control are transparent and hollow.

In a possible design, the target control may be one pattern, including but not limited to a bird pattern, a fish pattern, a fan pattern, or the like. Alternatively, the target control may include at least two patterns. For example, the target control contains two fishes. One fish is used as the first part of the target control and is superimposed with the first digit on the digital clock, to become the background of the first digit. The other fish is used as the second part of the target control and is superimposed with the first digit, to become the foreground of the first digit. In this way, the generated to-be-displayed image includes the target control containing two fishes.

In a possible design, first information may further be displayed when the display is in the always-on-display state, and a color of the first information may be set to be consistent with a color of the digit of the digital clock. For example, the first information may include but is not limited to information such as a location, an icon, a date, and a push message. The color of the first information is set to be consistent with the color of the digit of the digital clock, which helps improve user experience.

In a possible design, the method may further include: The electronic device detects a tap operation on the target control, and plays a time of the digital clock in response to the tap operation.

According to a second aspect, an embodiment of this application provides an electronic device, and the electronic device includes a processor, a memory, and a display. The display is configured to display a user interface. The memory is configured to store one or more computer programs. When the computer program is executed by the processor, the electronic device is enabled to perform the following operations: obtaining a first image, a second image, and a third image, where the first image includes a first part of a target control, the second image includes a second part of the target control, and the third image includes a digital clock; sequentially superimposing the first image, the third image, and the second image to generate a to-be-displayed image, where in the to-be-displayed image, the first part and the second part of the target control form the target control, and the target control overlaps at least one digit of the digital clock; and displaying the to-be-displayed image when the display is in an always-on-display state.

In a possible design, the digital clock includes digits used to represent hours and digits used to represent minutes. The digits used to represent hours are in a different row from the digits used to represent minutes. The digits used to represent hours include a first digit in the tens place and a second digit in the ones place. The target control included in the to-be-displayed image overlaps the first digit.

In a possible design, when the computer program is executed by the processor, the electronic device is further enabled to perform the following operation: separately invoking the first image and the third image according to a file name of the first image and a file name of the third image. The file name of the first image includes a layout type of the digital clock, a value of the digit that overlaps the target control, and a location relationship between the first image and the digital clock. The file name of the third image includes the clock layout type of the digital clock, the value of the digit that overlaps the target control, and a location relationship between the third image and the digital clock.

In a possible design, a size of the first part of the target control is less than a size of the first image, and a size of the second part of the target control is less than a size of the second image.

In a possible design, a layout of the digital clock is a single-clock layout or a dual-clock layout.

In a possible design, each digit included in the digital clock corresponds to three groups of image resources, the three groups of image resources include one group of image resources corresponding to the single-clock layout and two groups of image resources respectively corresponding to two clocks in the dual-clock layout, and each group of image resources includes the first image used as a background layer and the second image used as a foreground layer.

In a possible design, image formats of the first image, the second image, and the third image are all a portable network graphics png format.

In a possible design, the target control is a bird pattern.

In a possible design, the target control includes at least two patterns.

In a possible design, when the computer program is executed by the processor, the electronic device is further enabled to perform the following operation: displaying first information when the display is in the always-on-display state, where a color of the first information may be set to be consistent with a color of the digit of the digital clock.

In a possible design, when the computer program is executed by the processor, the electronic device is further enabled to perform the following operations: detecting a tap operation on the target control, and playing a time of the digital clock in response to the tap operation.

According to a third aspect, an embodiment of this application further provides an electronic device, where the electronic device includes modules/units for performing the method in any possible design according to any one of the foregoing aspects. These modules/units may be implemented by hardware, or may be implemented by hardware by executing corresponding software.

According to a fourth aspect, an embodiment of this application further provides a computer-readable storage medium. The computer-readable storage medium includes a computer program. When the computer program is run on an electronic device, the electronic device is enabled to perform the method in any possible design in any one of the foregoing aspects.

According to a fifth aspect, an embodiment of this application further provides a computer program product. When the computer program product runs on a terminal, the electronic device is enabled to perform the method in any possible design in any one of the foregoing aspects.

These or other aspects of this application are more concise and easier to understand in the description of the following embodiments.

DESCRIPTION OF EMBODIMENTS

For ease of understanding, the following uses examples to describe some concepts related to embodiments of this application for reference. Details are as follows:

Always on display (always on display): In an always-on-display state, an electronic device may separately light some pixels to display content such as a clock, a date, and a weather condition.

The always-on-display state is a state in which a screen is turned off.

An always-on-display area is an area that is on a display panel and that is used to display information when the electronic device is in the always-on-display mode. When the electronic device is in a screen-locked state, some subpixels on the display panel (that is, some subpixels lighting the display panel) may be in an on state, and the other subpixels are in an off state. In this way, some areas of the display panel remain in a steady-on state, and the other areas are in a blank-screen state. The steady-on area may be referred to as an always-on-display area.

The following describes the technical solutions in embodiments of this application with reference to the accompanying drawings in embodiments of this application. The terms "first" and "second" below in the descriptions of embodiments of this application are merely used for a description purpose, and shall not be understood as an indication or implication of relative importance or implicit indication of a quantity of indicated technical features. Therefore, a feature limited by "first" or "second" may explicitly or implicitly include one or more features.

Embodiments disclosed in this application may be applied to an electronic device with a display, and the electronic device has an always-on-display function. In some embodiments of this application, the electronic device may be a portable electronic device, such as a mobile phone, a tablet computer, a wearable device (for example, a smartwatch) with a wireless communication function, or a vehicle-mounted device, that includes a function such as a personal digital assistant and/or a music player. An example embodiment of the portable electronic device includes but is not limited to a portable electronic device using iOS®, Android®, Microsoft®, or another operating system. The portable electronic device may alternatively be, for example, a laptop computer (Laptop) with a touch-sensitive surface (for example, a touch panel). It should be further understood that in some other embodiments of this application, the electronic device may alternatively be a desktop computer with a touch-sensitive surface (for example, a touch panel).

Figure 1:
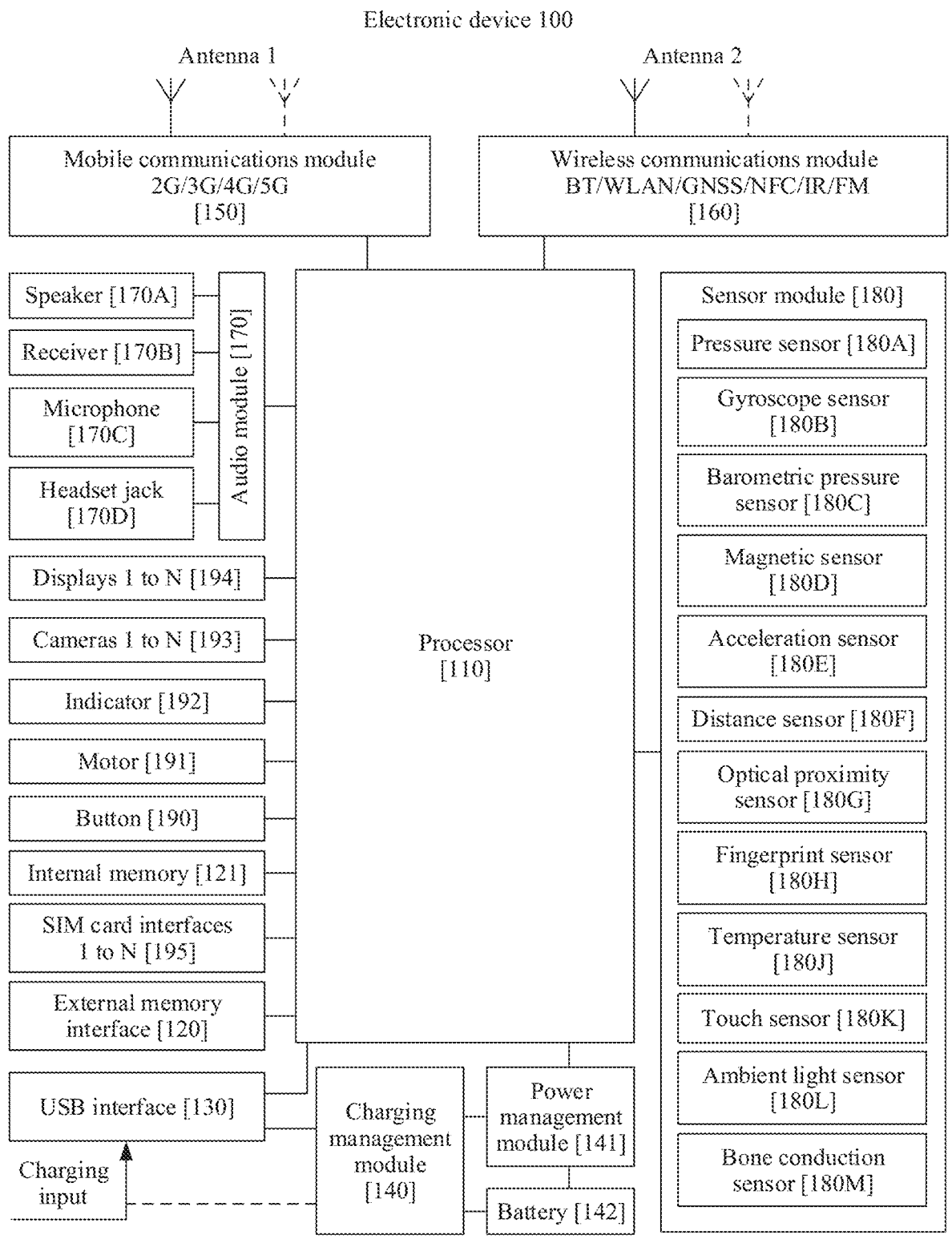
FIG. 1 is a schematic diagram of a hardware structure of an electronic device according to an embodiment of this application.

FIG. 1 is an example of a schematic diagram of a structure of an electronic device 100.

It should be understood that the electronic device 100 shown in the figure is merely an example, and the electronic device 100 may have more or fewer components than those shown in the figure, may combine two or more components, or may have different component configurations. Components shown in the figure may be implemented by hardware that includes one or more signal processing and/or application-specific integrated circuits, software, or a combination of hardware and software.

As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H a temperature sensor 180J, a touch sensor 180K, an ambient light sensor 180L, a bone conduction sensor 180M, and the like.

The following specifically describes each part of the electronic device 100 with reference to FIG. 1.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory, to avoid repeated access and reduce a waiting time of the processor 110. Therefore, system efficiency can be improved.

The processor 110 may run an always-on-display method according to embodiments of this application. When different components are integrated into the processor 110, for example, a CPU and a GPU are integrated, the CPU and the GPU may cooperate to perform the operation prompt method provided in embodiments of this application. For example, in the operation prompt method, some algorithms are performed by the CPU, and other algorithms are performed by the GPU, to achieve relatively high processing efficiency.

In some embodiments, the processor 110 may include one or more interfaces. For example, the interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 via the CSI, to implement a photographing function of the electronic device 100. The processor 110 communicates with the display 194 via the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

It may be understood that an interface connection relationship between the modules illustrated in embodiments of this application is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that is applied to the electronic device 100 and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system. GNSS), frequency modulation (frequency modulation, FM), a near field communication (near field communication, NFC) technology, an infrared (infrared, IR) technology, or the like. The wireless communications module 160 may be one or more components integrating at least one communications processing module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system. GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode. AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

In embodiments of this application, the display 194 may be one integrated flexible display, or may be a spliced display including two rigid screens and one flexible screen located between the two rigid screens.

The electronic device 100 may implement a photographing function through the camera 193, the ISP, the video codec, the GPU, the display 194, the application processor, and the like.

The ISP may be configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external memory card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode audio signals. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions.

The gyroscope sensor 180B may be configured to determine a moving posture of the electronic device 100. In some embodiments, angular velocities of the electronic device 100 around three axes (namely, axes x, y, and z) may be determined through the gyroscope sensor 180B. The gyroscope sensor 180B may be configured to implement image stabilization during photographing. The gyroscope sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. For example, a fingerprint sensor may be configured on a front side (below the display 194) of the electronic device 100, or a fingerprint sensor may be configured on a rear side (below the rear-facing camera) of the electronic device 100. In addition, the fingerprint sensor may be alternatively configured in the touchscreen to implement a fingerprint recognition function. In other words, the fingerprint sensor may be integrated with the touchscreen to implement the fingerprint recognition function of the electronic device 100. In this case, the fingerprint sensor may be disposed in the touchscreen, or may be a part of the touchscreen, or may be disposed in the touchscreen in another manner. In addition, the fingerprint sensor may further be implemented as a full-panel fingerprint sensor. Therefore, the touchscreen may be considered as a panel on which a fingerprint may be collected at any position. In some embodiments, the fingerprint sensor may process a collected fingerprint (for example, the fingerprint sensor may check whether the fingerprint is verified) and send a fingerprint processing result to the processor 110, and the processor 110 performs corresponding processing based on the fingerprint processing result. In some other embodiments, the fingerprint sensor may further send the collected fingerprint to the processor 110, so that the processor 110 processes the fingerprint (for example, verifies the fingerprint). In this embodiment of this application, the fingerprint sensor may use any type of sensing technology, which includes but is not limited to an optical sensing technology, a capacitive sensing technology, a piezoelectric sensing technology, an ultrasonic sensing technology, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external memory card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

Although not shown in FIG. 1, the electronic device 100 may further include a Bluetooth apparatus, a positioning apparatus, a flash, a micro projection apparatus, a near field communication (near field communication, NFC) apparatus, and the like. Details are not described herein.

All the following embodiments may be implemented in an electronic device 100 with the foregoing hardware structure (for example, a mobile phone or a tablet computer). The hardware structure of the electronic device 100 is described in FIG. 1. In the following embodiments, an Android (Android) system with a layered architecture is used as an example to describe a software structure of the electronic device 100.

Figure 2:
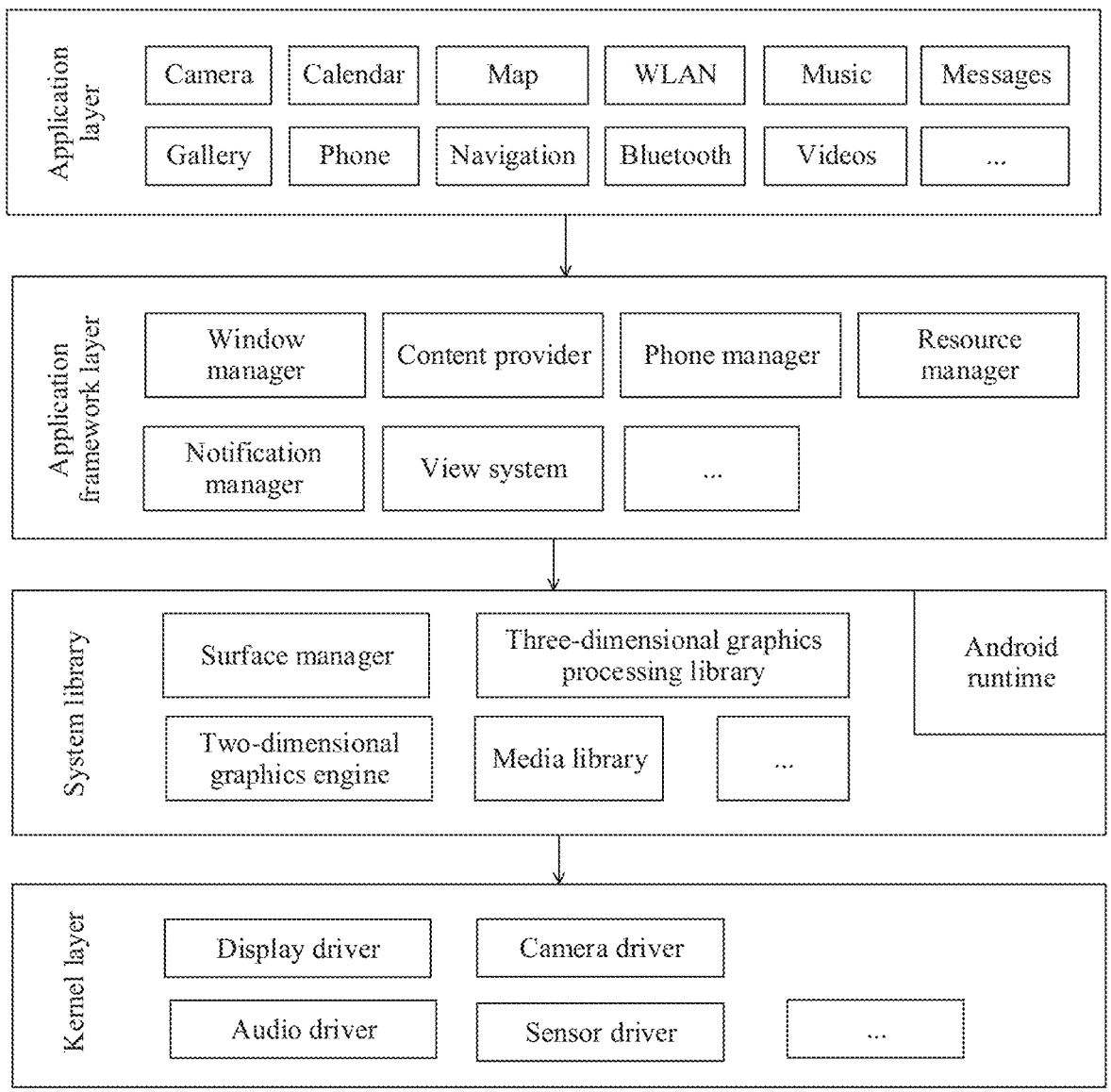
FIG. 2 is a block diagram of a software structure of an electronic device according to an embodiment of this application.

FIG. 2 is a block diagram of a software structure of the electronic device 100 according to an embodiment of the present invention.

As shown in FIG. 2, a layered architecture is used for the software structure of the electronic device. In the layered architecture, software is divided into several layers, and each layer has a clear role and task. The layers communicate with each other through a software interface. In some embodiments, an Android system is divided into four layers from top to bottom: an application layer, an application framework layer, an Android runtime (Android runtime) and system library, and a kernel layer.

The application layer may include a series of application packages. As shown in FIG. 2, the application packages may include applications such as Call, Camera, Gallery, Calendar, Phone, Map, Navigation. WLAN, Bluetooth, Music, Video, and Messages.

The application framework layer provides an application programming interface (application programming interface, API) and a programming framework for an application at the application layer. The application framework layer includes some predefined functions. As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides various resources such as a localized string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a performance function that needs to be invoked in java language, and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats such as MPEG-4, G.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes some examples of user interfaces (user interface, UI) provided by the electronic device 100. The term "user interface" in the specification, claims, and accompanying drawings of this application is a medium interface for interaction and information exchange between an application or an operating system and a user, and implements conversion between an internal form of information and a form that can be accepted by the user. The user interface is usually represented in a form of a graphical user interface (graphical user interface, GUI), and is a user interface that is related to a computer operation and that is displayed in a graphic manner. An interface element may be an icon, a window, a control, or the like displayed on a display of the electronic device. The control may include visible interface elements such as an icon, a button, a menu, a tab, a text box, a dialog box, a status bar, a navigation bar, or a widget (widget).

Figure 3:
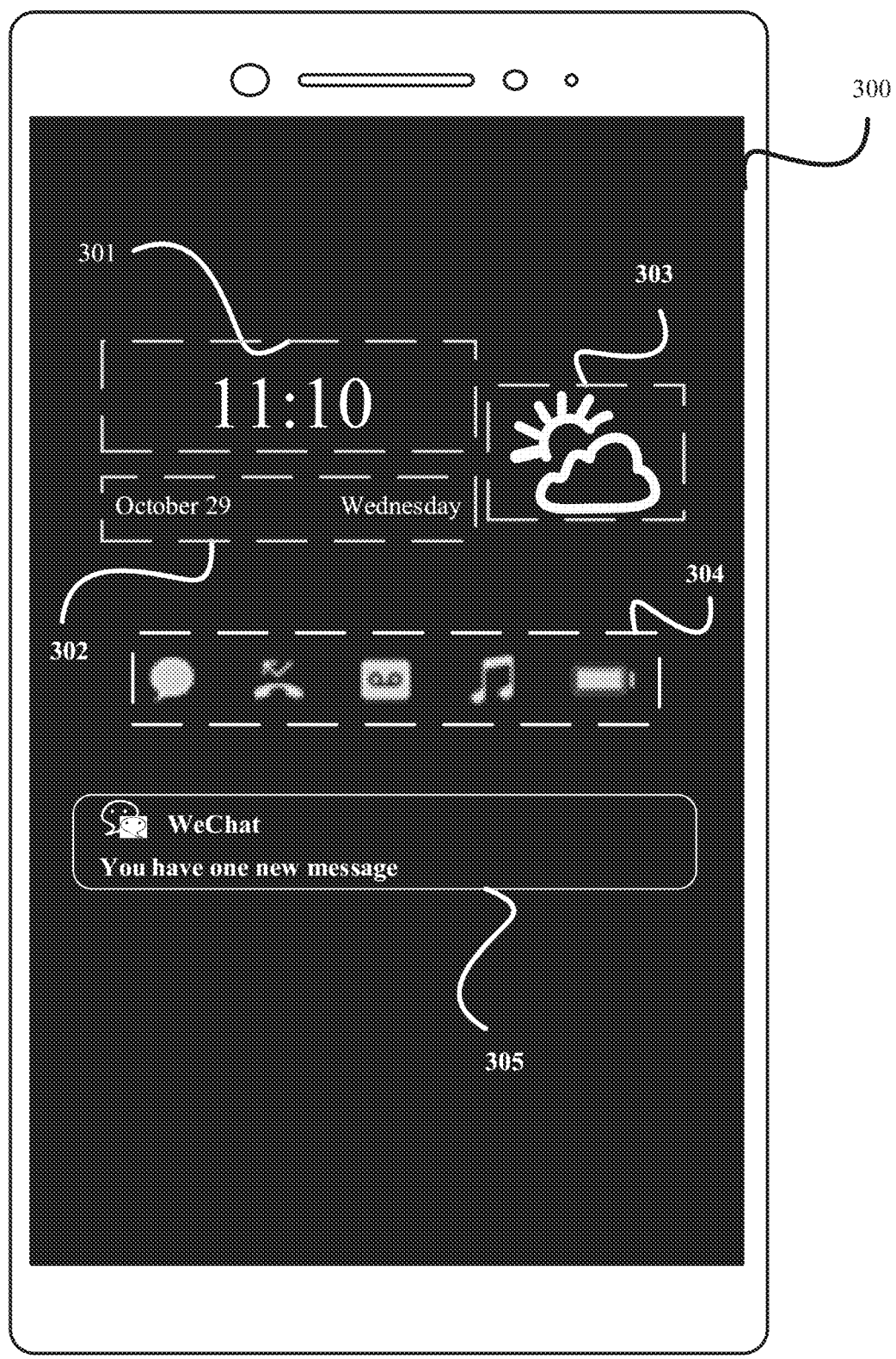
FIG. 3 is a schematic diagram of a user interface according to an embodiment of this application.

FIG. 3 shows an example of a user interface 300 displayed on the display 194 of the electronic device 100.

Figure 4A:
FIG. 4a is a schematic diagram of an always-on-display interface according to an embodiment of this application.
Figure 4B:
FIG. 4b is a schematic diagram of another always-on-display interface according to an embodiment of this application.
Figure 4C:
FIG. 4c is a schematic diagram of still another always-on-display interface according to an embodiment of this application.

As shown in FIG. 3, the user interface 300 is an always-on-display interface of the electronic device. The user interface 300 may include a digital clock 301. The digital clock 301 may include a time digit. A layout style of the digital clock may be horizontal display, that is, digits used to represent hours are displayed in a same line (or row) as digits used to represent minutes. It should be understood that FIG. 3 does not limit the layout style of the digital clock in this embodiment of this application. The layout style of the digital clock in this application may alternatively be another style, for example, double-row display, as shown in FIG. 4a, FIG. 4b, or FIG. 4c. To be specific, the digits used to represent hours are displayed in a different line (or row) from the digits used to represent minutes. The digits used to represent hours may be displayed in the first line (or row), and the digits used to represent minutes may be displayed in the second line (or row); or the digits used to represent minutes may be displayed in the first line (or row), and the digits used to represent hours may be displayed in the second line (or row).

In some other embodiments, the user interface 300 may further include a date 302, a weather widget (widget) 303, and the like, and may further include icons 304 of various applications, for example, a WeChat icon, a Phone icon, a Messages icon, and a current battery level. In some other embodiments, the user interface 300 may further include a push message 305, for example, a WeChat message reminder.

It may be understood that FIG. 3 merely shows an example of the always-on-display interface on the electronic device 100, and constitutes no limitation on this embodiment of this application.

In an always-on-display scenario, when the electronic device displays a digital clock, a bird pattern is used as a background or a foreground of the digital clock, and two visual effects are mainly formed. One visual effect is shown in FIG. 4a in which time is superimposed on the bird pattern to form a visual effect that the time is in front of the bird pattern. The other visual effect is shown in FIG. 4b in which the bird pattern is superimposed on the time to form a visual effect that the bird pattern is in front of the time. The two visual effects are relatively monotonous, and therefore, user's pursuit of a richer display effect cannot be met.

Therefore, this application provides a time display method. The method is applicable to an electronic device with a display, and the electronic device has an always-on-display function. In the method, the electronic device obtains a first image, a second image, and a third image, where the first image includes a first part of a target control, the second image includes a second part of the target control, and the third image includes a digital clock. The first image, the third image, and the second image are sequentially superimposed to generate a to-be-displayed image. In the to-be-displayed image, the first part of the target control becomes a background (background, bg) of the digital clock, and the second part of the target control becomes a foreground (foreground, fg) of the digital clock. The first part used as the background and the second part used as the foreground form the complete target control. The target control overlaps at least one digit of the digital clock. For example, the target control is a complete bird pattern. As shown in FIG. 4c, the first image includes the first part of the target control, that is, a tail of the bird, the second image includes the digital clock, and the third image includes the second part of the target control, that is, a body part of the bird. In a to-be-displayed image obtained by superimposing the three images, the tail of the bird is used as the background of the digit "0" included in the digital clock, and the body part of the bird is used as the foreground of the digit "0", so that an interspersed visual effect that the first part of the target control is in front of the digit "0" and the second part of the target control is behind the digit "0" is formed. Compared with a display effect that the digit "0" and the entire target control form a single front-to-back relationship, a richer display effect can be provided for a user according to the time display method in this application when the electronic device displays the digital clock in an always-on-display state.

It should be understood that the time display method provided in this embodiment of this application is not only applicable to a digital clock, but also applicable to an analog clock. In the following embodiments, only a digital clock is used as an example for description.

The following describes in detail the time display method provided in this embodiment of this application with reference to the accompanying drawings.

In this embodiment of this application, the digital clock may be a 24-hour clock, or may be a 12-hour clock. For ease of description, the following embodiments are described by using an example in which the digital clock is a 24-hour clock.

Figure 5:
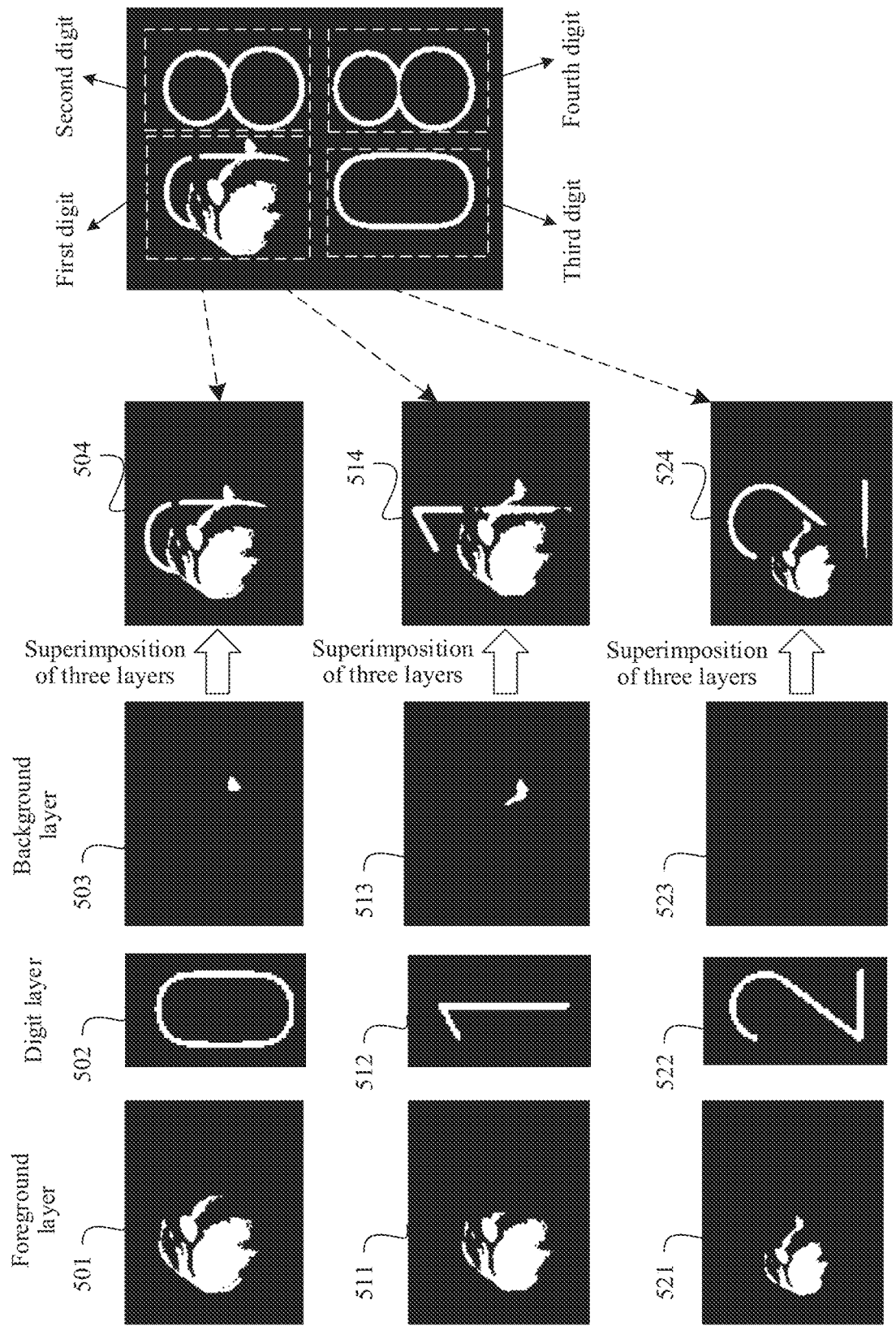
FIG. 5 is a schematic diagram of a process of always on display according to an embodiment of this application.

For example, as shown in FIG. 5, the time on the digital clock is 08:08. The time on the digital clock includes digits used to represent hours and digits used to represent minutes, and the digits used to represent hours are in a different row from the digits used to represent minutes. The digits used to represent hours include a first digit in the tens place and a second digit in the ones place, where the first digit may be a value such as 0, 1, or 2, and the second digit may be a value such as 0, 1, 2, . . . , or 9. The digits used to represent minutes include a third digit in the tens place and a fourth digit in the ones place, where the third digit may be a value such as 0, 1, 2, . . . , or 6, and the fourth digit may be a value such as 0, 1, 2, . . . , or 9.

The target control may be superimposed on any one or more of the first digit, the second digit, the third digit, and the fourth digit on the digital clock, to obtain the to-be-displayed image. The target control in the to-be-displayed image is superimposed on any one or more digits, to form an interspersed visual effect. The following embodiment is described by using an example in which the target control is superimposed on one digit on the digital clock to obtain the to-be-displayed image.

For example, the target control is a bird pattern. The bird pattern may be superimposed on the first digit on the digital clock, to obtain a to-be-displayed image. In the to-be-displayed image, the bird pattern overlaps the first digit, to form an interspersed visual effect. The first digit is a digit that is in the tens place and that represents hours, and a possible value of the first digit is 0, 1, or 2. In a clocking process of the digital clock, the first digit changes three times in 24 hours, and a change frequency of the first digit is lower than that of the second digit, the third digit, and the fourth digit. In this way, compared with a case in which the bird pattern is superimposed on another digit (for example, the second digit, the third digit, or the fourth digit) for display, the case in which the bird pattern is superimposed on the first digit for display can reduce power consumption.

The following describes the time display method in this embodiment of this application by using an example in which the target control (the bird pattern) is superimposed on the first digit of the digital clock.

In an example, the value of the first digit is "0", a part of the target control is at the foreground layer, and the other part is at the background layer. As shown in FIG. 5, an image 501 at the foreground layer includes a first part of a bird, an image 502 at a digit layer includes the digit "0", and an image 503 at the background layer includes a second part of the bird. An image 504 is obtained after the image 501, the image 502, and the image 503 are superimposed. In the image 504, the first part of the bird and the second part of the bird form a complete bird pattern. In the image 504, the target control (the bird pattern) and the digit "0" form an interspersed visual effect, that is, a visual effect that the first part of the bird is in front of the digit "0" and the second part of the bird is behind the digit "0".

In another example, the value of the first digit is "1", a part of the target control is at the foreground layer, and the other part is at the background layer. As shown in FIG. 5, an image 511 at the foreground layer includes a first part of a bird, an image 512 at a digit layer includes the digit "1", and an image 513 at the background layer includes a second part of the bird. An image 514 is obtained after the image 511, the image 512, and the image 513 are superimposed. In the image 514, the first part of the bird and the second part of the bird form a complete bird pattern. In the image 514, the target control (the bird pattern) and the digit "1" form an interspersed visual effect, that is, a visual effect that the first part of the bird is in front of the digit "1" and the second part of the bird is behind the digit "1".

In still another example, the value of the first digit is "2", and the entire target control is at the foreground layer. As shown in FIG. 5, an image 521 at the foreground layer includes an entire bird pattern, an image 522 at a digit layer includes the digit "2", and an image 523 at the background layer has no pattern. An image 524 is obtained after the image 521, the image 522, and the image 523 are superimposed. In the image 524, a visual effect that the entire target control (the bird pattern) is in front of the digit "2" is formed.

In the foregoing several examples, values of the first digit of the digital clock are different. The target control may be divided differently as shapes of the digits "0", "1", and "2" are different. Different values respectively correspond to different first parts of the target control in the images at the foreground layer, and different values respectively correspond to different second parts of the target control in the images at the background layer. Therefore, in the image 504, the image 514, and the image 524 that are obtained after the images at the foreground layer, the digit layer, and the background layer corresponding to the values are superimposed, visual effects of superimposing the target control (the bird pattern) and the first digit are also different. In this way, the bird pattern may be flexibly combined with the shape of the digit, and different superimposition effects are displayed as time of the digital clock changes, which provides a richer visual effect for the user.

In this embodiment of this application, a format of any one of the image at the background layer, the image at the digit layer, and the image at the foreground layer is a portable network graphics (portable network graphic, png) format. In this way, areas other than the bird pattern in the image at the background layer and the image at the foreground layer are transparent and hollow, and an area other than the digit in the image at the digit layer is transparent and hollow. Superimposition of the images at the three layers does not affect display of the digit on the digital clock, and does not affect display of the bird pattern. In addition, pixels in only an area in which the digital clock and the target control (the bird pattern) are located need to emit light on the to-be-displayed image, so that power consumption can be reduced.

In the foregoing example, the visual effect of the always on display is described by using only an example in which the first digit is superimposed on the bird pattern. For a time display method in which the second digit, the third digit, or the fourth digit is superimposed on the target control, refer to related descriptions of the foregoing example. Details are not described herein again.

Figure 6:
FIG. 6 is a schematic diagram of a single-clock layout according to an embodiment of this application.
Figure 7:
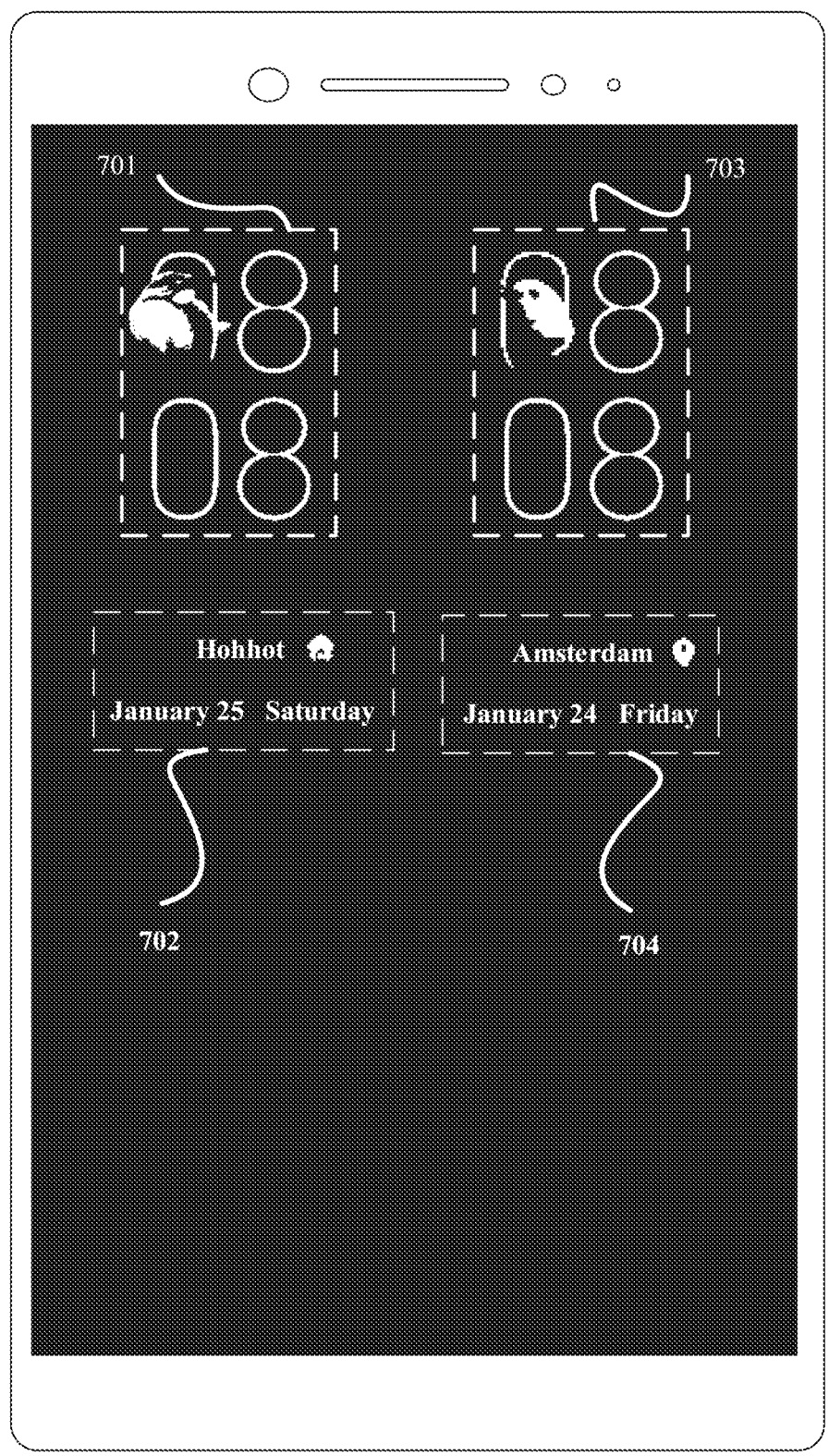
FIG. 7 is a schematic diagram of a dual-clock layout according to an embodiment of this application.

In this embodiment of this application, the layout of the digital clock may be a single-clock layout shown in FIG. 6. As shown in FIG. 6, a digital clock 601 is displayed in an always-on-display interface. For example, the electronic device may obtain a current geographical location, and set a time of the digital clock 601 based on a time zone of the current geographical location. In some other embodiments, the layout of the digital clock may alternatively be a dual-clock layout shown in FIG. 7. Two clocks may display times at two different locations. For example, a time of one digital clock may be set based on a time zone corresponding to a home location (for example, a location of household registration or a location of a common residence), and a time of the other digital clock may be set based on a time zone corresponding to a current location (for example, a destination of a business trip) of the electronic device. As shown in FIG. 7, a digital clock 701 and a digital clock 703 are displayed in an always-on-display interface. For example, a time on the digital clock 701 is a local time and date in Hohhot, China. A house icon (as shown in a dashed-line box 702) is displayed below the digital clock 701, and the time of the digital clock 701 is a time based on a time zone of a home location. A time on the digital clock 703 is a local time and date in Amsterdam. A positioning icon (as shown in a dashed-line box 704) is displayed below the digital clock 703, and the time of the digital clock 703 is a time based on a time zone of a current location of the electronic device.

For example, the target control and the first digit are superimposed. A value of the first digit may be 0, 1, or 2, and each value of the first digit may correspond to three groups of image resources, including one group of single-clock image resources and two groups of dual-clock image resources. File names of a group of image resources may be in the following format: clock type_digit n_background.png and clock type_digit n_foreground.png. A single-clock prefix is single, and a dual-clock prefix is dual. For example, if the value of the first digit is "0", the digit n may be represented as digit (digit) 0; if the value of the first digit is "1", the digit n may be represented as digit1: or if the value of the first digit is "2", the digit n may be represented as digit2.

For example, if the value of the first digit is "2", file names of a group of single-clock image resources corresponding to the value of the first digit are single_digit2_bg.png and single_digit2_fg.png, and file names of two groups of dual-clock image resources corresponding to the value of the first digit are dual1_digit2_bg.png, dual1_digit2_fg.png, dual2_digit2_bg.png, and dual2_digit2_fg.png.

Figure 8A:
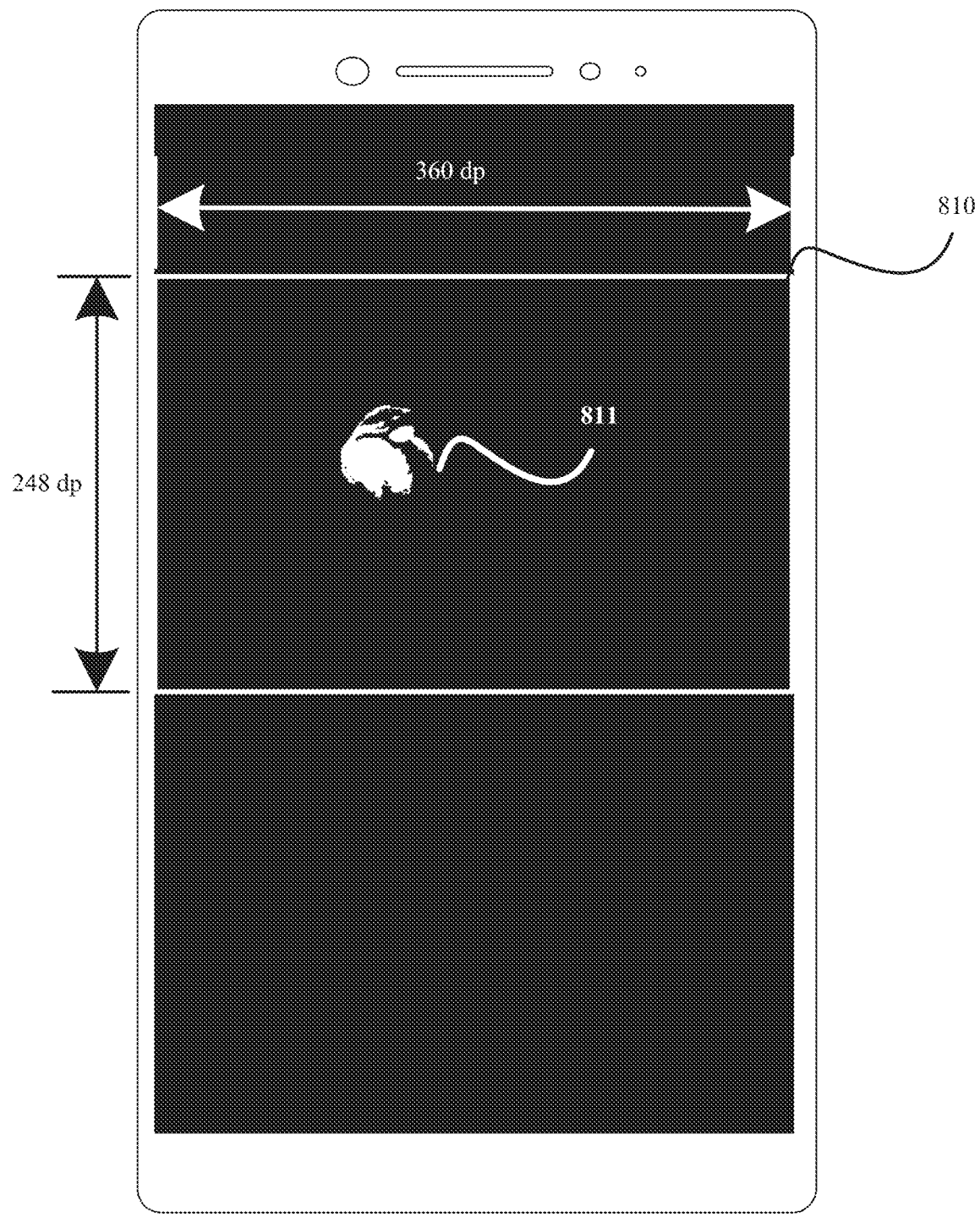
FIG. 8a is a schematic diagram of a single-clock image resource specification according to an embodiment of this application.
Figure 8B:
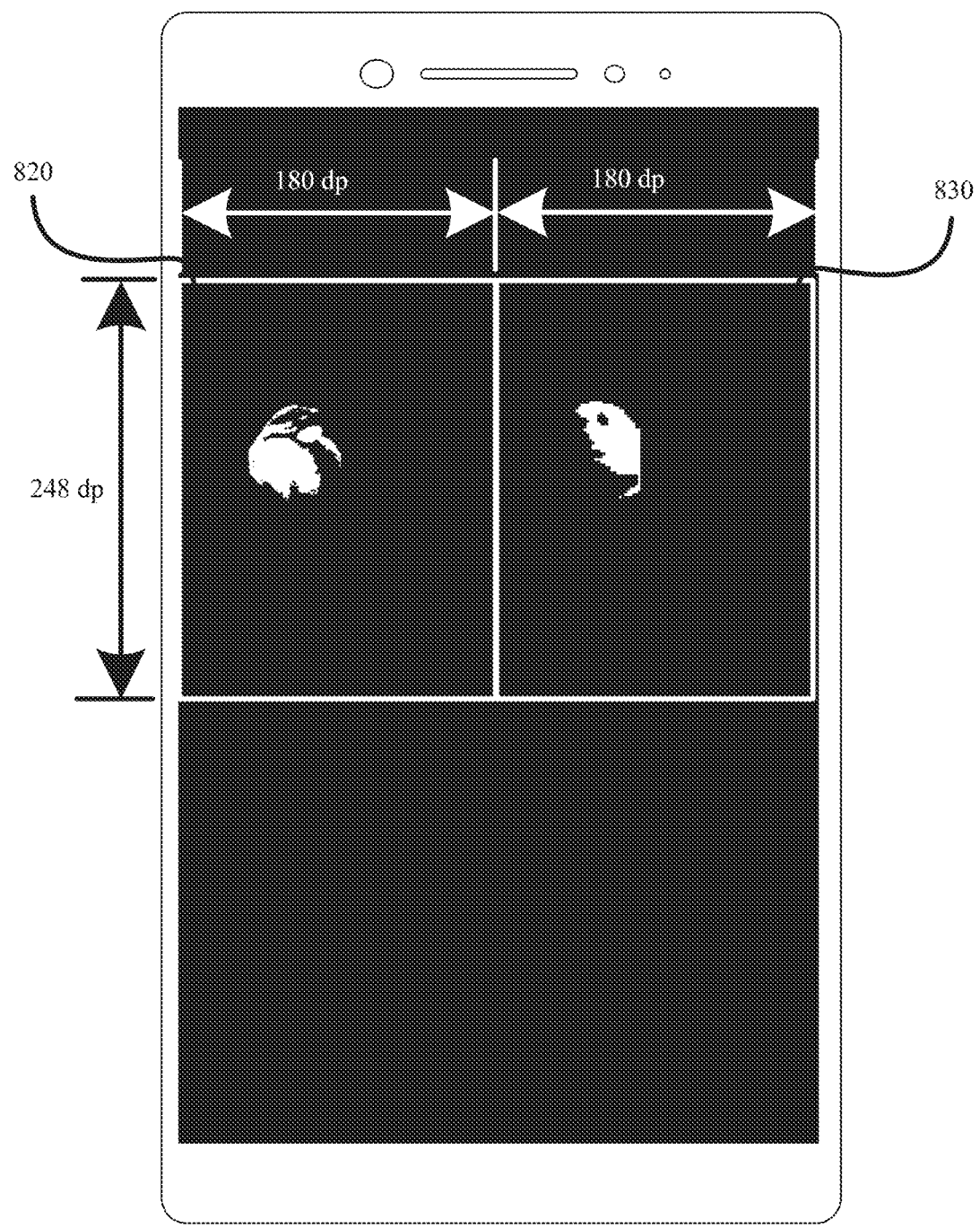
FIG. 8b is a schematic diagram of a dual-clock image resource specification according to an embodiment of this application.

In this embodiment of this application, an image specification of an image resource may be set to a fixed size, and does not change with a time digit. Using the single-clock layout as an example, a width corresponding to the image specification of the single-clock image resource may be set to be consistent with the width of the display. As shown in FIG. 8a, a width is 360 dp, and a height is 248 dp. Using the dual-clock layout as an example, an image specification of each dual-clock image resource (an image 820 and an image 830) may be 180 dp in width and 248 dp in height, as shown in FIG. 8b.

In this example, in an image corresponding to each image resource, the size of the target control is less than the size of the image. For example, for an image 810 shown in FIG. 8a, the size of the image is 360 dp in width and 248 dp in height. A bird pattern 811 in the image does not cover the entire image, that is, the image 810 has a transparent and hollow area. In this way, when the image 810 is displayed in the always-on-display interface, only pixels in an area in which the bird pattern 811 is located need to emit light, so that screen burning can be prevented.

In addition, the image specification is set to be relatively large, so that display of target controls of a plurality of shapes and sizes can be supported. When a superimposed target control is designed for the digital clock, the size of the target control is not limited to only one size. Otherwise, the target control cannot be displayed when the target control is replaced with another target control of a relatively large size.

The following describes an always on display (AOD) layout.

For example, the AOD layout is shown as the theme.xml file:

```
<?xml version="1.0" encoding="utf-8">
<HWTheme>
    <item style=" digitclock" />, // The clock style is digital clock
    <item clock=" 3" />, // A layout style of the digital clock is marked
    <item foreground=" 1" />, // A location of a foreground image is marked (an optional value is 0, 1, or 2)
    <item background=" 1" />, // A location of a background image is marked (an optional value is 0, 1, or 2)
    <item fondcolor="#FFF222" />, // A value is a hexadecimal value corresponding to an RGB value. This attribute takes effect for a date, lunar calendar, geographical location, and pure-color icon skin change. If this attribute is not set, a default color #FFFFFF is used
</HWTheme>
```

In the AOD layout, the layout style of the digital clock may be a horizontal display style shown in FIG. 3, or may be a dual-row display style shown in FIG. 4a, FIG. 4b, FIG. 4c, or the like.

In some embodiments, a value of the location of the foreground image may indicate a display location, on the digital clock, of a part of the target control in the image at the foreground layer. A value of the location of the background image may indicate a display location, on the digital clock, of the other part of the target control in the image at the background layer. Optional values of the locations of the foreground image and the background image are 0, 1, or 2. When the values of the locations of the foreground image and the background image are "0", it indicates that the corresponding image at the foreground layer and the corresponding image at the background layer do not change over time. When a display effect of the target control is designed, a display area of the digital clock needs to be avoided to ensure that a digit is not blocked.

When the values of the locations of the foreground image and the background image are "1", the target control is displayed at the location of the first digit. A value of the first digit on a 24-hour digital clock may be 0, 1, or 2, and each value may correspond to three groups of image resources.

When the value of the first digit is "0", the corresponding three groups of image resources are named as follows.
  single_digit0_fg.png, single_digit0_bg.png;
  dual1_digit0_fg.png, dual1_digit0_bg.png; and
  dual2_digit0_fg.png, dual2_digit0_bg.png;
when the value of the first digit is "1", the corresponding three groups of image resources are named as follows:
  single_digit1_fg.png, single_digit1_bg.png;
  dual1_digit1_fg.png, dual1_digit1_bg.png; and
  dual2_digit1_fg.png, dual2_digit1_bg.png; or
when the value of the first digit is "2", the corresponding three groups of image resources are named as follows:
  single_digit2_fg.png, single_digit2_bg.png;

dual1_digit2_fg.png, dual1_digit2_bg.png: and
dual2_digit2_fg.png, dual2_digit2_bg.png.

Names of the foregoing image resources need to match and cannot be changed. When 0, 1, and 2 are separately displayed at the location of the first digit, an image at the foreground layer and an image at the background layer that correspond to the value of the first digit are simultaneously displayed at the location of the first digit, so that different visual effects obtained by superimposing the target control and the first digit can be displayed based on a change of the value of the first digit.

When the values of the locations of the foreground image and the background image are "2", the target control is displayed at the location of the second digit. The value of the second digit on the 24-hour digital clock may be 0, 1, 2, . . . , or 9, and each value may correspond to three groups of image resources.

When the value of the second digit is "0", the corresponding three groups of image resources are named as follows:
single_digit0_fg.png, single_digit0_bg.png;
dual1_digit0_fg.png, dual1_digit0_bg.png: and
dual2_digit0_fg.png, dual2_digit0_bg.png;
when the value of the second digit is "1", the corresponding three groups of image resources are named as follows:
single_digit1_fg.png, single_digit1_bg.png;
dual1_digit1_fg.png, dual1 digit1_bg.png; and
dual2_digit1 fg.png, dual2_digit1_bg.png;
. . .
when the value of the second digit is "9", the corresponding three groups of image resources are named as follows:
single_digit9_fg.png, single_digit9_bg.png;
dual1_digit9_fg.png, dual1_digit9_bg.png; and
dual2_digit9_fg.png, dual2_digit9_bg.png.

Names of the foregoing image resources need to match and cannot be changed. When 0, 1, 2, . . . , and 9 are separately displayed at the location of the second digit, the foreground image and the background image corresponding to the value of the second digit are simultaneously displayed at the location of the second digit.

In some other embodiments, the target control may alternatively be displayed on a digit that represents minutes on the digital clock. In this case, values of the locations of the foreground image and the background image may be alternatively 3 or 4.

When the values of the locations of the foreground image and the background image are "3", the target control is displayed at the location of the third digit. The value of the third digit on the 24-hour digital clock may be 0, 1, 2, . . . or 6, and each value may correspond to three groups of image resources.

When the value of the third digit is "0", the corresponding three groups of image resources are named as follows:
single_digit0_fg.png, single_digit0_bg.png;
dual1_digit0_fg.png, dual1_digit0_bg.png; and
dual2_digit0_fg.png, dual2_digit0_bg.png:
. . .
when the value of the third digit is "6", the corresponding three groups of image resources are named as follows:
single_digit6_fg.png, single_digit6_bg.png;
dual1_digit6_fg.png, dual1_digit6_bg.png; and
dual2_digit6_fg.png, dual2_digit6_bg.png.

Names of the foregoing image resources need to match and cannot be changed. When 0, 1, 2, . . . , and 9 are separately displayed at the location of the third digit, the foreground image and the background image corresponding to the value of the third digit are simultaneously displayed at the location of the third digit.

When the values of the locations of the foreground image and the background image are "4", the target control is displayed at the location of the fourth digit. The value of the third digit on the 24-hour digital clock may be 0, 1, 2, . . . , or 9, and each value may correspond to three groups of image resources. For specific image resources, refer to names of image resources corresponding to each value of the second digit when the values of the locations of the foreground image and the background image are "2". Details are not described herein again.

In the AOD layout, digits on the digital clock are in an image format and the colors of the digits cannot be changed. When other information in addition to the digital clock is displayed in the always-on-display interface, a color of the other information may be different from the color of the digit. In this embodiment of this application, the color of the other information may be set and changed. Generally, a default color may be set to white. When the color of the other information needs to be changed, a value of item fondcolor in the theme.xml file is changed.

In an example, a single-clock layout is used as an example. As shown in FIG. 6, a color of information such as a date (for example, a Gregorian calendar date or a lunar calendar date), various application icons, and a battery level (for example, information marked by a dashed-line box 602) displayed below the digital clock 601 may be set. In this way, the color of the information marked by the dashed-line box 602 may be changed, so that the color of the digital clock displayed in the always-on-display interface is consistent with the color of other information. This helps improve user experience.

In another example, a dual-clock layout is used as an example. As shown in FIG. 7, a color of information (for example, information marked by a dashed-line box 702) such as a location, an icon, and a date (for example, a Gregorian calendar date and a day in a week) displayed below the digital clock 701 may be set, and a color of information (for example, information marked by a dashed-line box 704) such as a location, an icon, and a date (for example, a Gregorian calendar date and a day in a week) displayed below the digital clock 703 may be set. In this way, the colors of the information marked by the dashed-line box 702 and the dashed-line box 704 may be changed, so that the color of the digital clock displayed in the always-on-display interface is consistent with the color of other information. This helps improve user experience.

In this embodiment of this application, the target control may be a pattern of a bird in the foregoing example, or may be a pattern of another object, including but not limited to a pattern of a flower, a pattern of the moon, a pattern of a fan, and the like, which are not listed one by one herein.

In the foregoing embodiments, an example in which the target control includes a pattern of one object (such as a bird) and the target control and one digit of the digital clock are superimposed for display is used for description.

In some other embodiments, the target control and a plurality of digits of the digital clock may be superimposed for display to form an interspersed visual effect. It should be understood that the target control may be a pattern of one object, or may include patterns of a plurality of objects.

The following describes another possible implementation of the time display method in this application by using an example in which the target control includes patterns of two objects and the target control and two digits are superimposed for display. The two objects are patterns of different goldfish.

Figure 9:
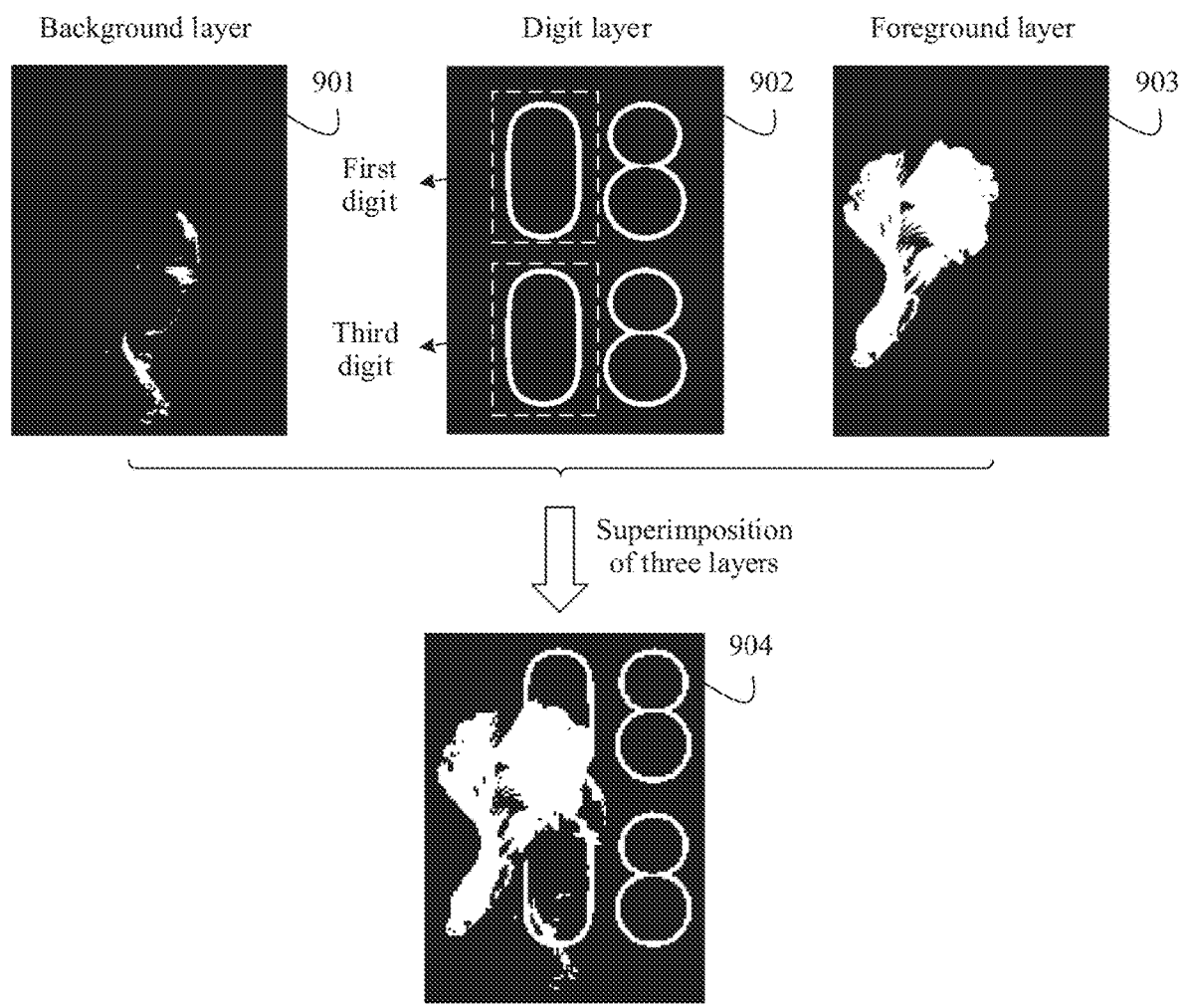
FIG. 9 is a schematic diagram of another process of always on display according to an embodiment of this application.

As shown in FIG. 9, a target control includes a goldfish 01 in an image 901 and a goldfish 02 in an image 903. An image 902 includes a digital clock. The image 901, the image 902, and the image 903 are superimposed, the goldfish 01 in the image 901 is used as a background layer of two digits (a first digit and a third digit) of the digital clock, and the goldfish 02 in the image 903 is used as a foreground layer of the two digits (the first digit and the third digit) of the digital clock. Then, a to-be-displayed image 904 is obtained. In the to-be-displayed image 904, the goldfish 01 and the goldfish 02 form a target control, and an interspersed visual effect that the goldfish 01 is behind the first digit (whose value is 0) and the third digit (whose value is 0) (that is, used as a background) and the goldfish 02 is in front of the first digit (whose value is 0) and the third digit (whose value is 0) (that is, used as a background) can be formed.

In some other embodiments, the goldfish 01 in the image 901 and the goldfish 02 in the image 903 may alternatively be superimposed on only one digit on the digital clock to form an interspersed visual effect, or may be superimposed on three digits on the digital clock to form an interspersed visual effect, or may be superimposed on four digits on the digital clock to form an interspersed visual effect. For a specific implementation, refer to the example in FIG. 9. Details are not described herein again.

In the example shown in FIG. 9, for related content of the AOD layout, refer to the related content of the AOD layout in the foregoing embodiment. Details are not described herein again.

In this embodiment of this application, the to-be-displayed image displayed in the always-on-display interface may be always displayed at a same location on the display, or may be displayed at a changed location at a time interval. For example, the to-be-displayed image is displayed by moving a first quantity of pixels every preset duration. For example, the to-be-displayed image may be displayed by moving several pixels every 1 minute. Longer preset duration indicates a larger value of the first quantity. In this way, a display location at which the electronic device displays the to-be-displayed image in the always-on-display state changes at a time interval, so that pixels that emit light to display the to-be-displayed image on the display at a time interval vary. Compared with a case in which same pixels emit light when the electronic device displays the to-be-displayed image in the always-on-display state, a risk of pixel damage can be reduced, and a risk of screen burning of the electronic device can further be reduced.

In this embodiment, when the to-be-displayed image is displayed in the always-on-display state, the to-be-displayed image may be separately displayed in two non-overlapping areas at time intervals. In this way, when the to-be-displayed image is displayed in the two non-overlapping areas, pixels that emit light are completely different, so that a risk of screen burning of the display can be reduced.

Figure 10:
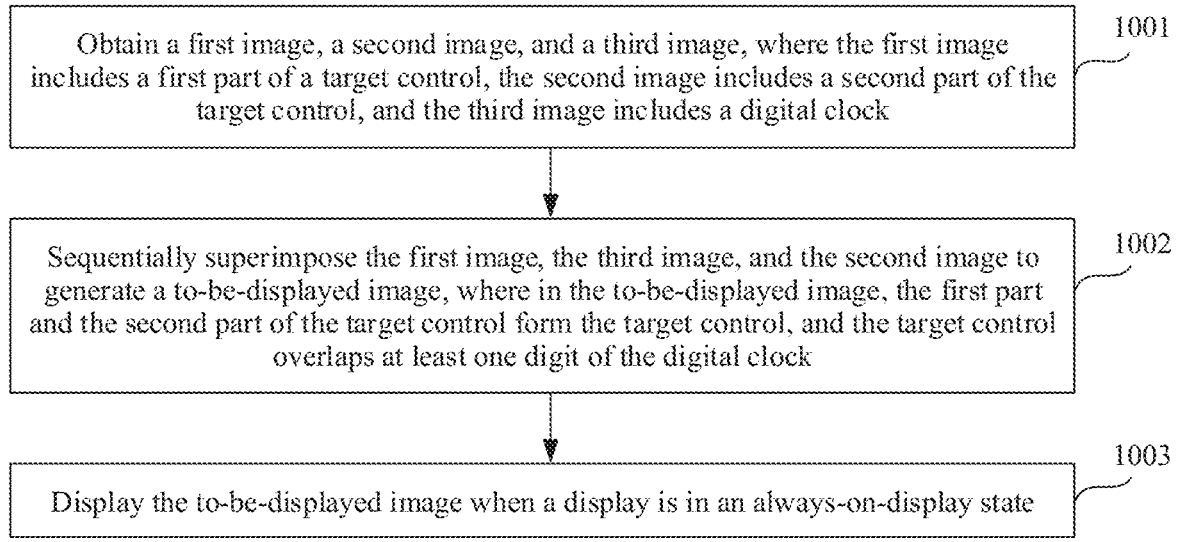
FIG. 10 is a schematic flowchart of an always-on-display method according to an embodiment of this application.

With reference to the foregoing embodiments and the accompanying drawings, an embodiment of this application provides an always on display method. The method may be implemented on an electronic device having the hardware structure shown in FIG. 1. As shown in FIG. 10, the always on display method in this embodiment of this application may include the following steps.

Step 1001: Obtain a first image, a second image, and a third image, where the first image includes a first part of a target control, the second image includes a second part of the target control, and the third image includes a digital clock. A layout of the digital clock may be a single-clock layout, or may be a dual-clock layout.

Using FIG. 9 as an example, the first image may be an image 901, the second image may be an image 903, the third image may be an image 902, and the target control is a bird pattern.

Step 1002: Sequentially superimpose the first image, the third image, and the second image to generate a to-be-displayed image, where in the to-be-displayed image, the first part and the second part of the target control form the target control, and the target control overlaps at least one digit of the digital clock.

Using FIG. 5 as an example, a to-be-displayed image shown as an image 904 is obtained after the image 901, the image 903, and the image 902 are superimposed.

Step 1003: Display the to-be-displayed image when a display is in an always-on-display state.

Based on this method, the electronic device sequentially superimposes the first image including the first part of the target control, the third image including the digital clock, and the second image including the second part of the target control, to generate the to-be-displayed image. In the generated to-be-displayed image, the first part and the second part of the target control form the target control, and an interspersed visual effect that the first part of the target control is displayed behind the digit and the second part of the target control is displayed in front of the digit can be formed. Compared with a display effect that a digit and an entire target control form a simple front-to-back relationship, a richer display effect can be provided for a user in this solution when the electronic device displays the digital clock in the always-on-display state.

In a possible implementation, the digital clock includes digits used to represent hours and digits used to represent minutes, and the digits used to represent hours are in a different row from the digits used to represent minutes. In another implementation, the digits used to represent hours and the digits used to represent minutes that are included in the digital clock may alternatively be located in a same row.

The digits used to represent hours include a first digit in the tens place and a second digit in the ones place, and the target control included in the to-be-displayed image partially overlaps the first digit. The first digit is a digit that is in the tens place and that represents hours, and a possible value of the first digit is 0, 1, or 2. In a timing process of the digital clock, the first digit changes three times in a timing period of 24 hours, and a change frequency of the first digit is lower than that of the second digit, a third digit, and a fourth digit, so that power consumption can be reduced.

In a possible design, that the electronic device obtains a first image and a third image may be implemented by separately invoking the first image and the third image according to a file name of the first image and a file name of the third image. The file name of the first image includes a layout type of the digital clock, a value of the digit that overlaps the target control on the digital clock, and a location relationship between the first image and the digital clock. The file name of the third image includes the clock layout type of the digital clock, the value of the digit that overlaps the target control on the digital clock, and a location relationship between the third image and the digital clock.

For example, the layout type of the digital clock is a single-clock layout, the value of the digit that overlaps the target control on the digital clock is 0, the location relationship between the first image and the digital clock is that the first image is a background of the digital clock, and the location relationship between the first image and the digital clock is that the first image is a foreground of the digital clock. In this example, the file name of the first image is single_digit0_bg.png, and the file name of the second image is single_digit0_fg.png. [01%] In a possible design, a size of the first part of the target control is less than a size of the first image, and a size of the second part of the target control is less than a size of the second image. In this design, the target control does not cover the entire superimposed image, that is, there is a transparent and hollow area on the to-be-displayed image. In this way, when the to-be-displayed image is displayed in the always-on-display state, only pixels in an area in which the target control is located need to emit light, so that screen burning can be prevented.

In a possible design, each digit included in the digital clock corresponds to three groups of image resources, the three groups of image resources include one group of image resources corresponding to the single-clock layout and two groups of image resources respectively corresponding to two clocks in the dual-clock layout, and each group of image resources includes the first image used as a background layer and the second image used as a foreground layer.

In a possible design, image formats of the first image, the second image, and the third image are all a portable network graphics png format. In the to-be-displayed image generated by superimposing the first image, the second image, and the third image, all areas other than the digit and the target control on the digital clock are transparent and hollow.

In a possible design, the target control may be one pattern, including but not limited to a bird pattern, a fish pattern, a fan pattern, or the like. Alternatively, the target control may include at least two patterns. For example, the target control contains two fishes. One fish is used as the first part of the target control and is superimposed with the first digit on the digital clock, to become the background of the first digit. The other fish is used as the second part of the target control and is superimposed with the first digit, to become the foreground of the first digit. In this way, the generated to-be-displayed image includes the target control containing two fishes.

In a possible design, first information may further be displayed when the display is in the always-on-display state, and a color of the first information may be set to be consistent with a color of the digit of the digital clock. For example, the first information may include but is not limited to information such as a location, an icon, a date, and a push message, for example, information marked by a dashed-line box 602 in FIG. 6, or information marked by a dashed-line box 702 and a dashed-line box 704 in FIG. 7. The color of the first information is set to be consistent with the color of the digit of the digital clock. This helps improve user experience.

In a possible design, the method may further include: The electronic device detects a tap operation on the target control, and plays a time of the digital clock in response to the tap operation.

In the foregoing embodiments provided in this application, the method provided in embodiments of this application is described from a perspective of an electronic device serving as an execution body. To implement functions in the method provided in embodiments of this application, the electronic device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 11:
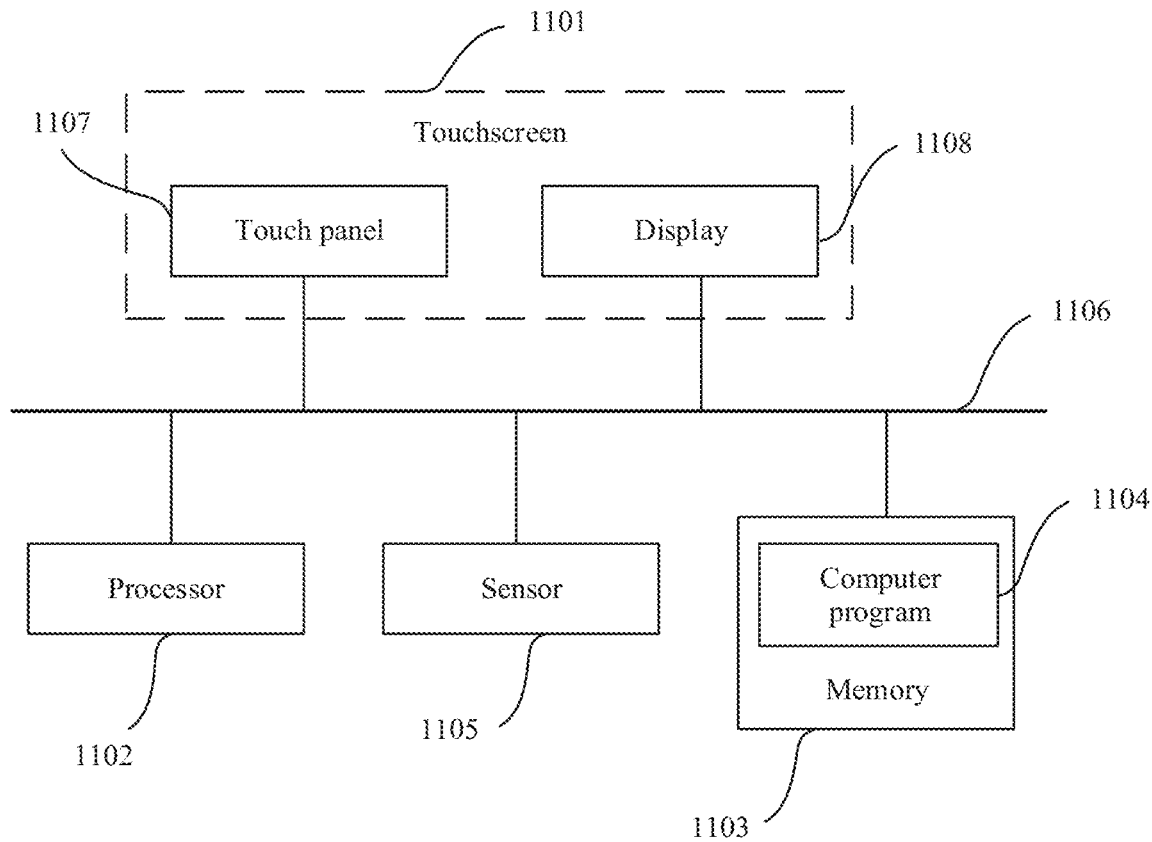
FIG. 11 is a schematic diagram of a structure of an electronic device according to an embodiment of this application.

When hardware is used for implementation, for hardware implementation of the electronic device, refer to FIG. 11 and related descriptions thereof.

As shown in FIG. 11, an electronic device 100 includes a touchscreen 1101, where the touchscreen 1101 includes a touch panel 1107 and a display 1108; one or more processors 1102; a memory 1103; one or more application programs (not shown); one or more computer programs 1104; and a sensor 1105. The foregoing components may be connected by using one or more communications buses 1106. The one or more computer programs 1104 are stored in the memory 1103 and are configured to be executed by the one or more processors 1102. The one or more computer programs 1104 include instructions, and the instructions may be used to perform the method in any one of the foregoing embodiments.

An embodiment of this application further provides a computer storage medium. The computer storage medium stores computer instructions. When the computer instructions are run on an electronic device, the electronic device is enabled to perform the related method steps, to implement the time display method in the foregoing embodiments.

An embodiment of this application further provides a computer program product. When the computer program product is run on a computer, the computer is enabled to perform the foregoing related steps, to implement the time display method in the foregoing embodiments.

In addition, an embodiment of this application further provides an apparatus. The apparatus may be specifically a chip, a component, or a module. The apparatus may include a processor and a memory that are connected to each other. The memory is configured to store computer executable instructions. When the apparatus runs, the processor may execute the computer executable instructions stored in the memory, to enable the chip to perform the translation method in the foregoing method embodiments.

The electronic device, the computer storage medium, the computer program product, or the chip provided in embodiments of this application may be all configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division into the foregoing function modules is taken as an example for illustration. During actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A time display method, applied to an electronic device with a display, wherein the method comprises:
    obtaining a first image, a second image, and a third image, wherein the first image comprises a first part of a target control, the second image comprises a second part of the target control, and the third image comprises a digital clock, wherein the obtaining a first image comprises:
        invoking the first image according to a file name of the first image, wherein
        the file name of the first image comprises a first indicator indicating a layout type of the digital clock, a second indicator indicating a value of the digit that overlaps the target control on the digital clock, and a third indicator indicating a location relationship between the first image and the digital clock, wherein the first image is invoked according to the first indicator, the second indicator, and the third indicator;
    sequentially superimposing the first image, the third image, and the second image to generate a to-be-displayed image, wherein in the to-be-displayed image, the first part and the second part of the target control form the target control, and the target control overlaps at least one digit of the digital clock; and
    displaying the to-be-displayed image when the display is in an always-on-display state.

2. The method according to claim 1, wherein the digital clock comprises digits that represent hours and digits that represent minutes, the digits that represent hours are in a different row from the digits that represent minutes, the digits that represent hours comprise a first digit in a tens place and a second digit in an ones place, and the target control comprised in the to-be-displayed image overlaps the first digit.

3. The method according to claim 1, wherein a size of the first part of the target control is less than a size of the first image, and a size of the second part of the target control is less than a size of the second image.

4. The method according to claim 1, wherein a layout of the digital clock is a single-clock layout or a dual-clock layout.

5. The method according to claim 1, wherein a value of at least one digit on the digital clock corresponds to three groups of image resources, the three groups of image resources comprise one group of image resources corresponding to a single-clock layout and two groups of image resources respectively corresponding to two clocks in a dual-clock layout.

6. The method according to claim 1, wherein image formats of the first image, the second image, and the third image are all a portable network graphics (png) format.

7. The method according to claim 1, wherein the target control is a bird pattern.

8. The method according to claim 1, wherein the method further comprises:
    displaying first information when the display is in the always-on-display state, wherein a color of the first information is set according to a color of the digit of the digital clock.

9. The method according to claim 1, wherein the method further comprises:
    detecting a tap operation on the target control; and
    playing a time on the digital clock in response to the tap operation.

10. An electronic device, comprising:
    a display;
    at least one processor; and
    one or more memories coupled to the at least one processor and storing programming instructions for execution by the at least one processor to cause the electronic device to perform following operations:
    obtaining a first image, a second image, and a third image, wherein the first image comprises a first part of a target control, the second image comprises a second part of the target control, and the third image comprises a digital clock, wherein the obtaining a first image comprises:
        invoking the first image according to a file name of the first image, wherein
        the file name of the first image comprises a first indicator indicating a layout type of the digital clock, a second indicator indicating a value of the digit that overlaps the target control on the digital clock, and a third indicator indicating a location relationship between the first image and the digital clock, wherein the first image is invoked according to the first indicator, the second indicator, and the third indicator;
    sequentially superimposing the first image, the third image, and the second image to generate a to-be-displayed image, wherein in the to-be-displayed image, the first part and the second part of the target control form the target control, and the target control overlaps at least one digit of the digital clock; and displaying the to-be-displayed image when the display is in an always-on-display state.

11. The electronic device according to claim 10, wherein the digital clock comprises digits that represent hours and digits that represent minutes, the digits that represent hours are in a different row from the digits that represent minutes, the digits that represent hours comprise a first digit in a tens place and a second digit in an ones place, and the target control comprised in the to-be-displayed image overlaps the first digit.

12. The electronic device according to claim 10, wherein a size of the first part of the target control is less than a size of the first image, and a size of the second part of the target control is less than a size of the second image.

13. The electronic device according to claim 10, wherein a layout of the digital clock is a single-clock layout or a dual-clock layout.

14. The electronic device according to claim 10, wherein each digit a value of at least one digit on the digital clock corresponds to three groups of image resources, the three groups of image resources comprise one group of image resources corresponding to a single-clock layout and two groups of image resources respectively corresponding to two clocks in a dual-clock layout.

15. The electronic device according to claim 10, wherein image formats of the first image, the second image, and the third image are all a portable network graphics (png) format.

16. The electronic device according to claim 10, wherein the target control is a bird pattern.

17. The electronic device according to claim 10, wherein the operations comprise:

displaying first information when the display is in the always-on-display state, wherein a color of the first information is set according to a color of the digit of the digital clock.

18. The electronic device according to claim 10, wherein the operations comprise:

detecting a tap operation on the target control; and playing a time on the digital clock in response to the tap operation.

19. One or more non-transitory computer-readable media storing computer instructions, that when executed by one or more processors, cause an electronic device to perform operations comprising:

obtaining a first image, a second image, and a third image, wherein the first image comprises a first part of a target control, the second image comprises a second part of the target control, and the third image comprises a digital clock, wherein the obtaining a first image comprises:

invoking the first image according to a file name of the first image, wherein the file name of the first image comprises a first indicator indicating a layout type of the digital clock, a second indicator indicating a value of the digit that overlaps the target control on the digital clock, and a third indicator indicating a location relationship between the first image and the digital clock, wherein the first image is invoked according to the first indicator, the second indicator, and the third indicator;

sequentially superimposing the first image, the third image, and the second image to generate a to-be-displayed image, wherein in the to-be-displayed image, the first part and the second part of the target control form the target control, and the target control overlaps at least one digit of the digital clock; and displaying the to-be-displayed image when the display is in an always-on-display state.

\* \* \* \* \*